July 4, 1933.  J. SNEED  1,917,184
BRAKE SHOE
Filed Dec. 30, 1929
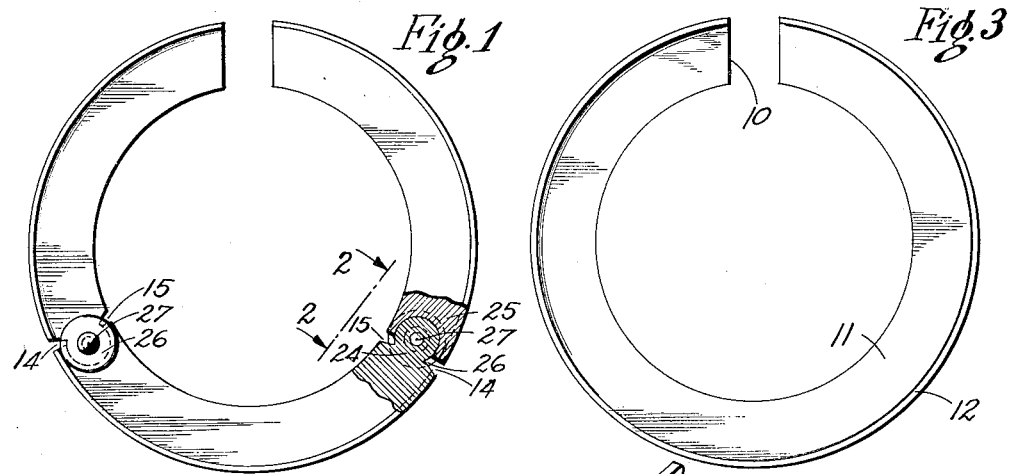
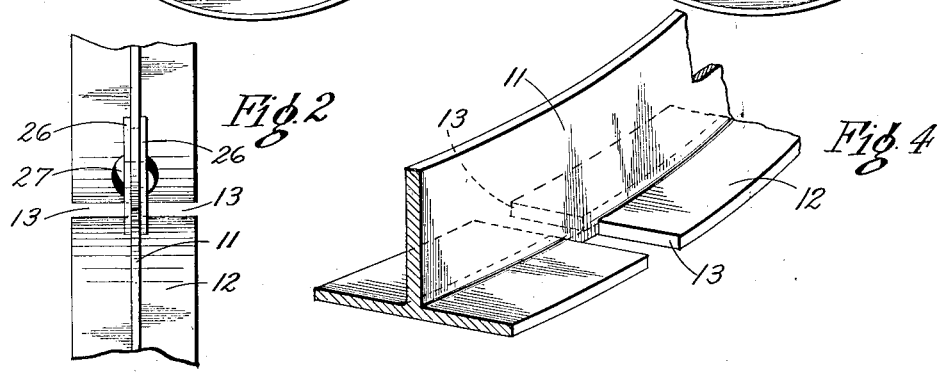
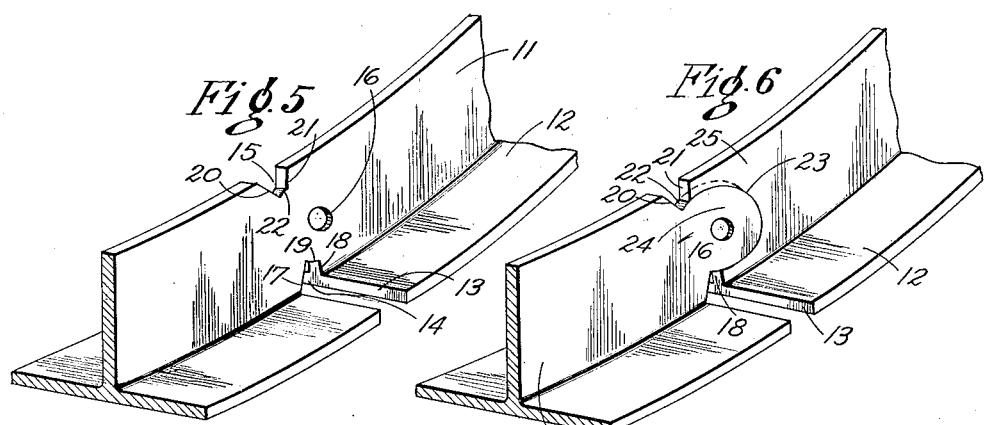
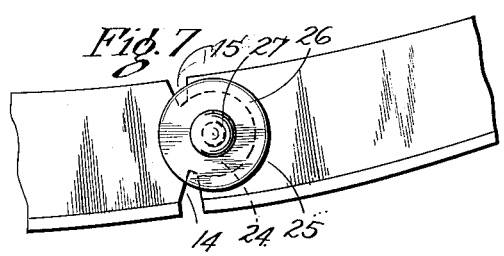
Inventor
JOHN SNEED
By Riley & Watts
Attorney Patented July 4, 1933

1,917,184

UNITED STATES PATENT OFFICE.

JOHN SNEED, OF GROSSE POINTE SHORES, MICHIGAN, ASSIGNOR TO THE MIDLAND STEEL PRODUCTS COMPANY, OF CLEVELAND, OHIO, A CORPORATION OF OHIO, TRUSTEE FOR STEELDRAULIC BRAKE CORPORATION, OF DETROIT, MICHIGAN, A CORPORATION OF MICHIGAN

BRAKE SHOE

Application filed December 30, 1929. Serial No. 417,302.

This invention relates to vehicle brakes, and more particularly to an articulated brake shoe.

The method of making a brake shoe, hereinabove mentioned, is set out and claimed in my co-pending application, Serial No. 565,750, filed the 29th day of September, 1931, which constitutes a division of this application.

One object of the invention is to form an articulated brake shoe from a single strip of stock.

Another object is to form a pivotal joint between two sections of a brake shoe by shearing a piece of stock and re-assembling the sections with the line of shear serving as a pivotal bearing therebetween.

Another object is to provide an improved pivotal joint for brake shoes capable of withstanding any compressive load to which the brake shoes may be subjected in service.

Another object is to provide a simple and effective pivotal connection for brake shoes constructed in such a manner as to insure a perfect fit between the parts thereof, and between the assembled brake shoes and the co-operating elements of a vehicle brake.

Other objects relating to details of construction and economies of manufacture will appear hereinafter.

In the accompanying drawing, which illustrates the preferred embodiment of the invention:

Figure 1 is a side elevation of an articulated brake shoe constructed in accordance with this invention, parts being broken away to more clearly show the structure.

Figure 2 is a detail view of one of the pivotal joints taken from a plane indicated by the line 2—2 in Figure 1 and looking in the direction of the arrows.

Figure 3 is a side elevation of the stock rolled into form preparatory to dividing the same into sections.

Figure 4 is a detail perspective view of the stock after the first step of the method of forming the pivotal joint has been taken.

Figure 5 is a similar view after the next operation has been performed.

Figure 6 is a similar view after the stock has been sheared.

Figure 7 is an elevation of the completed joint.

The brake shoe forming the subject-matter of this invention is of the general type shown in my co-pending application, Serial No. 347,515, filed March 16, 1929, and is primarily designed for use with the type of brake illustrated therein. The brake shoe disclosed in the said application consists of a split ring rolled from T-stock and having portions of the vertical web cut away to render the shoe sufficiently flexible. In the present invention a similar T-section split ring is utilized and flexibility is imparted thereto by articulating the same, a minimum amount of stock being cut away. Substantially the entire width of the vertical web is retained intact, thereby increasing the strength, rigidity, and durability of the shoe, while permitting free expanding and contracting movement.

In forming the improved brake shoe, a section of T-section stock is rolled to form a split ring 10 having a radial web 11 and a peripheral web 12. Preferably this operation is performed by the machine and method disclosed in my co-pending application, Serial No. 399,653, filed October 14, 1929. The ring 10, having the form shown in Figure 3, is then placed in a suitable machine and notches 13 are cut in the peripheral web 12 on opposite sides of the radial web 11 and at the points at which the pivotal joints are to be formed.

Notches 14 and 15, and apertures 16 are then punched in the radial web 11. Each notch 14 has two straight edges 17 and 18 and an arcuate edge 19. The straight edges 17 and 18 intersect the peripheral web 12 at the opposite edges of one pair of notches 13, so that each pair of notches 13 and the corresponding notch 14 form a continuous recess opening from the exterior surface of the ring 10 inwardly to the arcuate edge 19. The center of the circle determined by the arcuate edge 19 lies in the web 11 and is offset along the web from the notches 13. The straight edges 17 and 18 make substantially the same angle with radii drawn from such center to their respective intersections with the arcuate edge 19 in order to provide maximum clearance with a minimum weakening of the web 11. The aperture 16 is preferably concentric with this circle defined by the edge 19.

The notches 15 are formed on the inner side of the radial web 11 directly opposite the notches 14. Each notch 15 has straight edges 20 and 21 and an arcuate edge 22, similar in every respect to the edges 17, 18 and 19, respectively, of the notches 14. The edge 22 constitutes a portion of the circle defined by the edge 19.

After the formation of the notches described above, the radial web 11 is sheared between each pair of notches 14 and 15. The line of shear is indicated at 23, and constitutes the portion of the circumference of the circle defined by the edges 19 and 22 between the intersections therewith of the edges 18 and 21. The adjacent separated sections of the web 11 are thereby formed respectively with a head 24 and a socket 25.

By reason of the location of the center of the circle which includes the edges 19 and 22 and the line 23 at a point offset along the web 11 from the notches 14 and 15, the recess of the socket 25 is outlined by an arc greater than a semi-circle. Accordingly, the sections may be reassembled by slipping the heads 24 into the sockets 25 from the sides thereof in a reversal of the relative movement between the sections caused by the shearing operation, and will be held in this relation against movement in either direction parallel to the web 11.

Washers 26 having a diameter greater than the heads 24 are secured to the opposite sides of the web 11 by rivets 27 passing through the apertures 16. These washers prevent lateral separation of the heads 24 and sockets 25, while permitting free pivotal movement of one member relative to the other.

It will be evident that the parts of each pivotal joint must necessarily fit perfectly, since the bearing surfaces are the lines along which the web 11 was sheared to separate the sections. Furthermore, the dimensions of the completed brake shoe are readily held within small tolerances, if desired, since the sections of each shoe are originally cut from the same split ring.

While the foregoing description is necessarily of a detailed character in order that the invention may be fully set forth, it is to be understood that the invention is not limited to the specific embodiment disclosed, and that modifications and rearrangements of parts and steps may be resorted to within the scope of the following claims:

I claim:

1. An articulated brake shoe comprising a plurality of ring sectors having radial webs, said webs being pivotally connected to form a substantially complete articulated ring, each pivotal connection including complementary integral bearing portions on the respective webs.

2. An articulated brake shoe including a pair of ring sectors having substantially radial webs, complementary integral bearing surfaces on said webs, and means for securing said sectors together with said surfaces in operative relation.

3. An articulated brake shoe including a pair of ring sectors having substantially radial webs, and a pivotal joint between said webs including complementary integral bearing surfaces on the respective webs.

4. An articulated brake shoe including a plurality of ring sectors pivotally connected together to form a substantially complete ring, each pivotal connection including complementary integral bearing surfaces on adjacent sectors.

5. An articulated brake shoe including a pair of ring sectors, and a pivotal joint therebetween including complementary integral bearing surfaces on the respective sectors.

6. An articulated brake shoe comprising a plurality of ring sectors having substantially radial webs, the web of one of said sectors being formed with an arcuate recess in an end thereof, and an end of the web of another of said sectors being formed with an arcuate projection adapted, when said sectors are assembled, to bear in said recess.

7. An articulated brake shoe comprising a plurality of ring sectors having substantially radial webs, the web of one of said sectors being formed with an arcuate recess defined by more than 180 degrees of arc, and the web of another sector being formed with a projection having an arcuate outline of greater extent than said recess, and adapted to pivotally bear in said recess, when said sectors are assembled.

8. Means for joining a pair of co-planar strips for pivotal movement in the plane thereof comprising an end portion on one of said strips having an arcuate recess, and an end portion on the other strip having an arcuate projection adapted to bear in said recess and retain said strips against separation in the plane thereof, and means disposed on opposite sides of said strips for retaining the same against lateral separation.

9. Means for joining a pair of co-planar strips for pivotal movement in the plane thereof comprising an integral end portion on one of said strips having an arcuate recess, and an integral end portion on the other strip having an arcuate projection adapted to bear in said recess and retain said strips against separation in the plane thereof, and means carried by said projection and overlapping the opposite sides of the recessed strip for retaining said strips against lateral separation.

10. An articulated brake shoe comprising a plurality of ring sectors having co-planar radial webs, the web of one of said sectors being formed with an arcuate recess defined by more than 180 degrees of arc, and the web of another sector being formed with an arcuate projection pivotally bearing in said recess and retaining said webs against separation in the plane thereof, and means carried by said projection and overlapping opposite sides of the recessed web for retaining said sectors against lateral separation.

11. Means for joining a pair of flat strips for pivotal movement in the plane thereof comprising an end portion on one of said strips having an arcuate recess, and an end portion on the other strip having an arcuate projection adapted to bear in said recess and retain said strips against separation in the plane thereof.

12. Means for joining a pair of flat strips for pivotal movement in the plane thereof comprising an end portion on one of said strips having an arcuate recess, and an end portion on the other strip having an arcuate projection adapted to bear in said recess and retain said strips against separation in the plane thereof, and means for retaining the same against lateral separation.

In testimony whereof I hereunto affix my signature this 23rd day of December, 1929.

JOHN SNEED.